Aug. 22, 1961     J. H. FRY     2,996,975
ROTARY BEVERAGE-BREWING APPARATUS
Filed Aug. 30, 1956
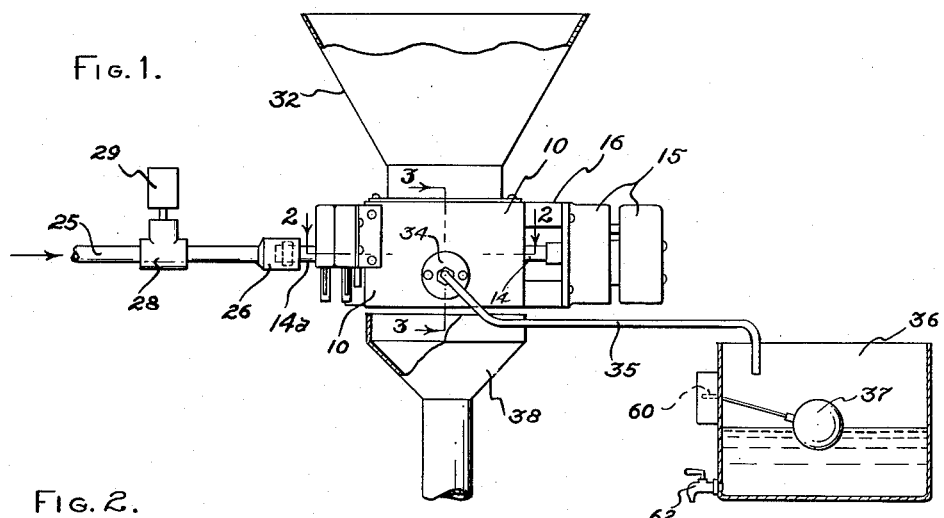
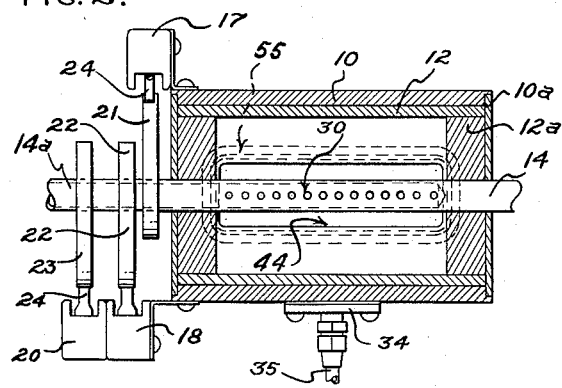
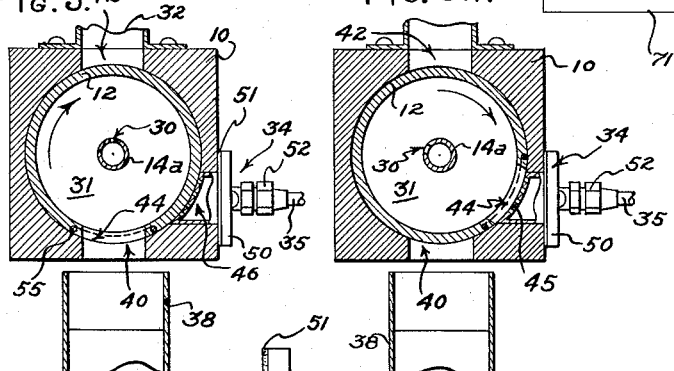
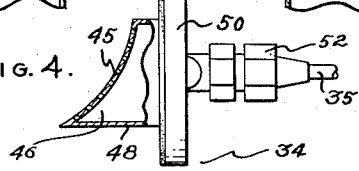
INVENTOR
JOHN H. FRY
BY HIS ATTORNEYS
HARRIS, KIECH, FOSTER & HARRIS

United States Patent Office 2,996,975
Patented Aug. 22, 1961

2,996,975
ROTARY BEVERAGE-BREWING APPARATUS
John H. Fry, Los Angeles, Calif., assignor to Automatic Enterprises, Inc., Los Angeles, Calif., a corporation of California
Filed Aug. 30, 1956, Ser. No. 607,151
10 Claims. (Cl. 99—289)

This invention relates to apparatus for brewing coffee beverage.

The particular object of the invention is to provide an exceedingly simple brewing structure which will yield fresh coffee in relatively small quantities, so that the brew will always be fresh, and which will intermittently and repeatedly furnish such small quantities automatically as long as required.

A further object is to provide an automatic coffee brewer of such simple nature that it will require only a single vessel to act to receive and measure fresh, ground coffee, serve as a brewing chamber, and constitute in itself dumping and flushing means.

It is additionally an object to provide a simple coffee brewer, having the single vessel described, which is actuated through its entire cycle by only a single motor, and having such controls as are required, including only a very few electrical switches and cooperating cam means driven by the motor to actuate such switches are required.

It is another object of the invention to provide a coffee brewing device having very few parts, and therefore exceptionally easy to keep in operative condition.

Other objects of the invention and various features of construction thereof are disclosed in the following specification and the accompanying drawing wherein certain embodiments are illustrated.

In the drawing:

FIG. 1 is a side elevation of the entire structure of a coffee brewer in accordance with this invention, the only omissions being any supporting framework desired and wiring for the electrical mechanism shown;

FIG. 2 is a horizontal cross section on the line 2—2 of FIG. 1;

FIG. 3 is a vertical cross section on the line 3—3 of FIG. 1, the rotary brewing vessel being in dumping position;

FIG. 3A is a view similar to that of FIG. 3, the rotary brewing vessel being in coffee-brewing position;

FIG. 4 is a vertical sectional detail of the self-cleaning filtering fitting through which the brew is taken off from the brewer to a brew-dispensing receptacle; and FIG. 5 is a wiring diagram for the electrical parts employed, their relationship to the moving parts being indicated therein.

The illustrated brewing structure includes essentially a single rotary brewing vessel, having a driven shaft, a single electric motor driving such shaft and rotary vessel, three cams on said shaft for operating three switches, and wiring, two of the switches controlling motor rotation and one switch controlling hot water feed.

As shown, a horizontal housing 10, which may be a machine block having a cylindrical bore, receives a rotary cylindrical brewing vessel 12. The ends of the cylindrical vessel 12 are closed with liquid-tight heads 12a and the housing 10 is provided with heads 10a which enclose the brewing vessel 12, close the ends of the housing 10, and may provide bearings for a motor shaft 14 which is shown as extending through the brewing vessel 12, is fixed in the heads 12a to drive the brewing vessel, and is in turn driven by an electric motor 15 mounted by appropriate bracket 16 on one end of the housing block 10.

As best seen in FIG. 2, an electric double throw switch 17 is secured to one end of the housing block 10 at one side and two similar electric switches 18 and 20 are mounted together in tandem on the same end of the housing 10 at the opposite side. These switches are arranged in succession, as illustrated, so as to be actuated by cams 21, 22 and 23 fixed and successively arranged on a hollow extension 14a of the motor drive shaft 14. Each of the switches 17, 18 and 20 is provided with a cam-actuated finger 24 externally mounted on each switch, such switches respectively having enclosed switch arms 17a, 18a and 20a (FIG. 5) movable to and from open and closed positions by the fingers 24 and the cams 21, 22 and 23, respectively, as presently to be described.

The hollow portion 14a of the shaft 14 is provided for the purpose of introducing hot water to the brew vessel, which is accomplished by a hot water pipe 25 connected with the outer end of the hollow extension 14a by a packed swivel joint 26. The pipe 25 is provided with a valve 28 which is controlled by a solenoid 29 under control of the switch 20. The hollow section 14a of the shaft 14 is conveniently formed by drilling the shaft 14 to provide a water passage, and at the inner end of such water passage a linear series of spray holes 30 is provided extending throughout the length of the brewing chamber 31 within the rotary vessel 12, as best indicated in FIG. 3.

The top of the housing 10, as shown, is provided with an elongated rectangular opening, presently to be described, around which is secured the discharge neck of a hopper 32 for fresh, ground coffee. At one side of the housing 10 there is affixed a fitting 34 to receive coffee brew, as also presently to be described, and pass it by a hot brew line 35 to a brew-receiving dispensing tank 36, which, in the form shown, contains a float 37 relied upon to control electric circuits to the switches 17 and 18 by the level of the coffee brew. Below the housing 10 there is located a dump funnel 38 for the reception of spent coffee grounds from an elongated rectangular passage 40 in the under side of the housing 10. This lower passage 40 is diametrically opposite, that is directly below, a similar elongated rectangular passage 42 in the top of the housing 10 which receives ground coffee from the above-mentioned hopper 32.

The rotary cylindrical brewing vessel 12 working in the cylindrical bore in the block housing 10 has but a single passage 44 which is of substantially the same size and shape as the size and shape of the two identical passages 40 and 42 in the housing 10 such size and shape being indicated in FIG. 2.

The cycle of operation of the rotary brewer 12 commences when the parts are in the position of FIG. 3, which is the same position as when the coffee grounds are dumped into the funnel 38 and brewing chamber 31 rinsed. This portion of the cycle causes the vessel 12 to rotate in the direction of the curved arrow of FIG. 3 to move its elongated passage 44 from the dump position of FIG. 3 around past the ground coffee feed passage 42 and on around to the brewing position of FIG. 3A, at which time rotation of the brewing vessel 12 is stopped. Here the brewing operation commences, water being introduced through the hot water pipe 25, past the now open valve 28, through the spray holes 30 and thence out through the vessel passage 44 by way of the fitting 34 to the hot coffee brew line 35. The fitting 34, which is separately shown in FIG. 4, includes a perforated filter screening wall 45, curved on the arc of the cylindrical brewing vessel 12. The hot brew passes through the filter wall 45 into a chamber 46 defined by a cylindrical neck 48, which is received in a corresponding bore in the lower portion of the housing block 10, and an outer head 50 bound by screws or the like to the wall of the housing block 10 and compressing a gasket 51. An appropriate coupling 52 connects the hot coffee brew line 35 to the fitting 34 for delivery of the brew to the previously mentioned dispensing tank 36.

When the brewing operation is finished, the elevated brew level raises the float 37 to energize the switch 18, whereby the motor 15 rotates the brewing vessel 12 around to the dump position of FIG. 3, where rotation stops.

From the foregoing description it will be observed that the trailing edge of the passage 44 serves to cut off the ground coffee feed into the brewing vessel 12 as the latter rotates, and a little later serves to wipe grounds from the perforated filter wall 45 and cut off coffee brew flow as a second stage of the rotation cycle takes place. To insure good contact around the edges of the elongated rectangular passage 44 with the cylindrical bore of the housing 10, an elongated rubber O-ring 55 is countersunk in a peripheral groove in the outer wall of the rotary vessel 12 at a distance back from each of the edges of the passage 44. Thus, during the brewing operation when hot water is being introduced under pressure into the brewing chamber 31, a good seal is effected with the inner wall of the cylindrical bore of the housing 10, and for a succeeding portion of the rotary cycle when the passage 44 is moving from the brewing position of FIG. 3A to the dump position of FIG. 3.

From the foregoing it will be apparent that, after rotation of the vessel 12 in the direction of the curved arrow from the position of FIG. 3 is commenced, the rate of movement of the passage 44 and the sizes of the passages 42 and 44 serve to measure the amount of ground coffee required to be charged into the brewing chamber 31, the charge being completed when the trailing edge of the passage 44 closes the passage 42. Also, the brewing stage continues as long as the perforated filter screen 45 and the chamber 46 are uncovered by any portion of the passage 44 of the rotary vessel 12. The next stage is movement to the dumping position of FIG. 3. During a short portion of this movement to the dump position, there may be a connection between the coffee brew chamber 46 behind the filter screen 45 and the discharge passage 40, so as to provide a limited amount of desirable back wash of brew in the chamber 46 backward through the filter perforations to the outlet 40.

During this interval hot water continues to be supplied from the pipe 25 past the water valve 28 so that the water passing through the spray holes 30 thoroughly washes out the coffee grounds and rinses the inner cylindrical wall of the vessel 12. During this stage the spray is directed upward, and by the time the position of FIG. 3 is fully reached, the grounds have been completely cleared out and washed into the dump funnel 38 before rotation ceases.

Referring to the wiring diagram of FIG. 5, the float 37 is indicated as moving vertically in the tank 36 and carrying a switch opening and closing contact actuating trigger 60 between the lower position and an upper position. When the brew has been dispensed from the brewing vessel 36, as by a faucet 62, the float 37 drops close to the bottom of the tank and the actuating trigger 60 closes a switch 63 to energize a relay 64 through a master switch 65 which will have been closed. When the relay 64 functions, it serves to close another switch 66, cutting in a by-pass line 67 so that the relay 64 will continue to be energized after the float 37 has been elevated somewhat by new coffee brew and the contact actuating trigger 60 has been raised to release the switch 63.

Also, when the relay 64 was energized, it operated to close another switch 70 in a branch line 71 leading to the switch 17. At this stage the switch arm 17a is in closed position to complete a circuit to the motor 15 by way of the switch 70, the line 71, the switch 17 and a line 72. The cam 21 is already in a position holding the switch arm 17a closed, this being effected through the medium of the respective actuating finger 24. The motor 15 now turns the drive shaft 14 and its hollow extension 14a, the cylindrical brewing vessel 12 and the three cams 21, 22 and 23 clockwise in the direction of the curved arrows of FIGS. 3 and 3A, so that the single elongated passage 44 in the vessel 12 is turned from the normal idle position of FIG. 3 upward past the coffee charging passage 42 and on around to the right to the position illustrated in FIG. 3A, which is the coffee brewing position. At this point the cam 21 has turned to release its actuating finger 24 so that the latter moves to the dotted line position and the switch arm 17a moves to its open broken-line position as indicated.

During movement of the cam 21, the cam 22 for the switch 18 moved to release its actuating finger 24 and permit closing of the switch 18 by movement of the switch arm 18a to its broken-line position, thus closing the corresponding part of a circuit 73 in which the switch 70 was located when in its broken-line position before actuation by the relay 64. This actuation of the switch arm 18a prepares for a second operating stage of the motor 15.

Shortly before the cam 21 completed its movement to open its switch 17, the cam 23 also moved to release the respective actuating finger 24 and release the switch arm 20a of the switch 20 for movement to the closed broken-line position whereby to complete a circuit through the switch 20 by way of a line 7 to the solenoid 29, thereby opening the hot water valve 28. This opening of the valve 28 may take place upon rotary movement of the brewing vessel passage 44 through about 270°, or a little before the vessel 12 reaches the position of FIG. 3A. Thus, flow of hot water, through the hot water pipe 25 into the brewing vessel 12 and out through the series of spray holes 30 into the ground coffee charge, may commence around 30° to 40° before the vessel 12 stops rotating. At the position seen in FIG. 3A the switch 17 opens, as above indicated, but hot water continues to enter to produce brew, because the switch 20 is closed to keep the solenoid 29 energized and the valve 28 open. Except for the flow of water and the production of brewed coffee, all the parts are stationary. As the brew rises in the dispensing tank 36, the float 37 rises and raises the actuating trigger 60 to open the switch 63 of the relay 64. However, when the switch 63 opens, the closed switch 66 continues energization of the relay 64 and maintains the switch 70 in the full-line position illustrated. When the brew rises to full position, the float 37 moves the trigger 60 to open another switch 66 in the relay circuit. The brewing operation having thus been completed (all the cams 21, 22 and 23 having meanwhile been stationary), de-energization of the relay 64 permits movement of the switch 70 to the broken-line position shown whereby to complete the circuit through the line 73 to the switch 18, the switch arm 18a of which had previously been closed as above described. This energizes the motor 15 which rotates the brewing vessel 12 from the position of FIG. 3A to the position of FIG. 3. At this stage, the cam 22 for the switch 18 has again moved to the switch opening position illustrated, whereupon the brewing vessel 12 stops in the discharge position of FIG. 3. During this movement the flow of brew out through the filter wall 45 has been cut off, but hot water is still being discharged through the spray holes 30. As the leading edge of the passage 44 moves across the discharge passage 40, the strong water spray (whose pressure had previously been relied upon to force brew from the vessel 12 to the dispensing tank 36) thoroughly washes out the spent coffee grounds as they are being dumped into the funnel 38, and cleans the inner wall of the cylindrical brewing vessel 12. At this stage the cycle is complete and the cam 23 is moved to operate the respective actuating finger 24 and open the switch 20, whereupon the water valve 28 closes by reason of de-energization of its solenoid 29.

These conditions maintain until coffee brew has been dispensed to drop the float 37 to the bottom of the dispensing tank 36, whereupon the switch 63 is again closed and the cycle is repeated.

In order to improve tight sealing about the brew outlet by the O-ring 55 when the cylindrical vessel 12 is in the brewing position of FIG. 3A, it may be desirable to offset the axis of the vessel 12 very slightly toward the outlet screen 45, so that the O-ring 55 is compressed more in this brewing position than at any other portion of the cycle. This condition may not only improve the liquid seal during brewing, but also improve wiping off the grounds from the screen 45, while reducing O-ring wear elsewhere such as at the coffee feed location. Such offset of the true axis of the cylindrical vessel 12 from the true axis of the housing 10 radially toward the screen 45 may be around twenty to twenty-five thousandths of an inch, or within a range of perhaps five thousandths to fifty thousandths of an inch, which may be variable also in accordance with the O-ring thickness.

From the foregoing it is apparent that the rotary brewing vessel 12, driven by the single motor 15, constitutes a self-contained unit which at the same time constitutes a measuring device for the ground coffee charge, and a brewing chamber through which the hot water is forced to produce the brew, the vessel 12 containing its own flushing and rinsing means. Thus, by this simple arrangement, all coffee-making operations take place in a single vessel.

The invention claimed is:

1. In combination in beverage-brewing apparatus: a housing having a cylindrical bore with a feed passage in one side, a brew discharge passage in another side, and a dump passage in a third side; a hollow cylindrical brew vessel having a cylindrical outer wall rotatably mounted in said cylindrical bore, and having a single passage to register successively with said passages of said housing on rotation therein; a motor having a shaft connected to one end of said brew vessel to rotate the latter; hopper means mounted on said housing to feed fresh beverage material to said feed passage and to said brew vessel through its passage on rotation of said vessel; filter means disposed in said brew-discharge passage immediately adjacent said vessel; a hollow axial water supply shaft leading into said brew vessel and spaced apart from the side wall thereof, said shaft having water discharge ports therein and being connected to rotate with said brew vessel, said discharge ports being located on a side of said hollow shaft opposite from said single passage and being directed toward the inner wall of said brew vessel opposite from said single passage thereof to direct water toward said inner wall; means to supply hot water to said hollow shaft for passage of water through said brew vessel and beverage material therein; and means controlling rotation of said brew vessel and flow of hot water through said vessel, said hollow shaft and said brew discharge passage.

2. Beverage brewing apparatus comprising, in combination, a housing having a bore, a hollow vessel rotatable in said bore and providing a brewing chamber, said vessel having an opening only at one side thereof for passage of fluid materials, means for rotating said vessel, means on said housing for feeding beverage material thereinto and into said brewing chamber, said housing having a passage therein to pass beverage material from said feeding means into said chamber of said vessel through said opening when said opening is in registry therewith, means forming a dump passage in said housing for discharge therethrough of spent beverage material from said chamber, a concentric hollow shaft connected with and rotating with said vessel and extending through said brewing chamber along the axis thereof and having spray holes directed away from said vessel opening into the interior of said brewing chamber and toward the interior walls of said brewing chamber opposite said opening of said vessel to leach beverage material in said chamber and also to rinse the walls of said chamber when in dump position, and means connected to said housing around a discharge port thereof to register with said opening on rotation of said vessel for conducting brewed beverage from said chamber via said vessel opening and said port when in registry.

3. In a beverage brewing apparatus of the character described, a brewing assembly comprising, in combination, a housing having a cylindrical bore formed therein, a hollow brewing cylinder mounted snugly within the bore of said housing for rotary movement relative thereto, means forming a single passage through the wall of said cylinder, means forming a feed passage into said cylindrical bore, means forming a dump passage from said bore substantially in the bottom thereof, means forming a brew discharge passage from said bore in the lower portion thereof, said passages being so arranged that said passage in said cylinder may register with said feed passage, said discharge passage, and said dump passage respectively upon rotation of said brewing cylinder, a concentric shaft extending substantially axially through said cylinder and mounted for rotation therewith, a water passageway extending axially through said shaft, said shaft being provided with a conduit connecting its passageway with the interior of said brewing cylinder, and said shaft having discharge passage means along a side thereof opposed to said passage of said brewing cylinder and directed toward the inner wall portion of said brewing cylinder remote from said passage thereof for directing a water stream against said wall portion and not toward said single passage.

4. The combination defined in claim 3 in which said passage in said cylinder is wider than the distance between said discharge passage and said dump passage, whereby water flow may be continuous during the brew discharge and dumping operations.

5. In a beverage brewing apparatus of the character described, the combination of a housing having a cylindrical bore formed therein, a concentric shaft extending axially through said bore, a hollow brewing cylinder having a cylindrical outer wall mounted snugly within said bore for rotary movement relative thereto, means forming a single passage through the wall of said cylinder, means forming a beverage material inlet through the upper portion of said housing, means forming a dumping outlet through said housing in the bottom thereof, means forming a beverage discharge outlet intermediate said inlet and said dumping outlet, whereby said passage may register successively with said inlet, said beverage discharge outlet and said dumping outlet upon rotation of said cylinder, a fluid passageway extending through said shaft and communicating with the interior of said cylinder through a radial hole to admit liquid constituents to said cylinder, a tank, a pipe extending from said beverage discharge outlet to said tank to deposit brewed beverage therein, and filter means for said brewed beverage at said beverage discharge outlet, said shaft being connected with said brewing cylinder to rotate with the latter, and said hole communicating with said fluid passageway being disposed to be always directed away from said single passage in said brewing cylinder and toward the opposite inner wall portion of said brewing cylinder for directing water into beverage material in such cylinder and rinsing spent beverage material from said inner wall portion of such cylinder.

6. In a beverage brewing apparatus of the character described, a brewing assembly comprising, in combination, a housing having a bore formed therein, a hollow brewing vessel mounted snugly within said bore and adapted for rotary movement relative thereto, means forming a single passage through the wall of said vessel, means forming a feed passage into said bore, means forming a dump passage from said bore substantially in the bottom thereof, means forming a discharge passage from said bore in the lower portion thereof, said passages being so arranged that said passage in said cylinder may register with said feed passage, said discharge passage, and said dump passage respectively upon rotation of said brewing vessel, a shaft extending axially through said vessel and mounted for rotation therewith, a fluid passageway extending axially through said shaft, said shaft being provided with a conduit connecting its passageway with the interior of said brewing vessel, said conduit being on a side of said shaft facing away from said passage in said vessel and directed to pass a water stream toward the inner wall of said vessel remote from said single passage of said brewing vessel to wash such remote wall portion free from spent beverage material; a filter associated with said discharge passage for filtering the brewed beverage passing therethrough, said single passage of said brewing vessel being wider than the distance between said brew discharge passage and said dump passage, and means adapted to control a flow of hot water through said shaft.

7. In a beverage brewing apparatus of the character described, a brewing assembly comprising, in combination, a housing having a substantially cylindrical bore formed therein, a hollow brewing cylinder having a cylindrical outer wall mounted snugly within the bore of said housing for relative rotary movement of said housing and said cylinder, means forming a single passage in the wall of said brewing cylinder, means forming a feed passage into said cylindrical bore, means forming a dump passage from said bore substantially in the bottom thereof, means forming a brew discharge passage from said bore in the lower portion thereof, said passages being so arranged that said passage in said cylinder may register with said feed passage, said discharge passage, and said dump passage respectively upon relative rotation of said cylinder and said housing, a shaft extending substantially axially through said cylinder for rotation therewith, a fluid passageway extending axially through said shaft, said shaft being provided with a conduit connecting its passageway with the interior of said brewing cylinder and facing away from said passage in said cylinder and directed toward an inner wall portion of said brewing cylinder remote from said single passage of said brewing cylinder to avoid directing fluid jets toward such passage, when said passage in said cylinder is in registry with said discharge passage and said dump passage, a filter associated with said discharge passage and adapted to filter the brewed beverage passing therethrough, and means adapted to effect relative rotation of said cylinder and said housing.

8. In combination in apparatus for producing a brew from solid beverage particles: a housing having a cylindrical bore disposed on a horizontal axis and provided with a feed passage at an upper side, a dump passage at a lower side, and an intermediate brew discharge passage; a hollow cylindrical brew vessel rotatably mounted about said horizontal axis in said bore and having a cylindrical outer wall engaging the inner wall of said cylindrical bore, said cylindrical brew vessel having a single opening in one side thereof providing a passage to register successively with said passage of said housing on rotation of said cylindrical brew vessel in said cylindrical bore; bearings carrying said brew vessel on said housing; a motor having a shaft connected to said cylindrical brew vessel to rotate the latter about said axis; a hollow axial water supply shaft leading into said brew vessel and through the center thereof and rotatable therewith and having water discharge ports therein on a side thereof opposite from and facing away from said single passage to direct water toward a portion of the inner wall of said brew vessel remote from said single passage to wash spent beverage particles therefrom and to supply water to said brew vessel and to fresh beverage particles therein and in an indirect path to said single passage; means to supply hot water to said hollow shaft and thence to said brew vessel and beverage particles therein; hopper means mounted on said housing to feed fresh beverage particles to said feed passage and thence through said feed passage to said hollow brew vessel when its opening registers with said feed passage on rotation of said brew vessel by said motor; filter means in said brew discharge passage; and means controlling said motor and rotation of said brew vessel and controlling flow of hot water to said hollow shaft and brew vessel.

9. A combination as in claim 8 wherein said axial shaft extends through said brew vessel, and said water discharge ports are in the form of a single row extending across the vessel and facing opposite from said single passage.

10. A combination as in claim 8 wherein said controlling means includes: means to move said brewing cylinder and its single passage progressively past said feed passage, said intermediate brew discharge passage, and said dump passage; and means to feed fresh beverage particles to said feed passage, and feed water to said hollow shaft under pressure.

References Cited in the file of this patent

UNITED STATES PATENTS

| | | |
|---|---|---|
| 1,164,619 | Jefferson | Dec. 14, 1915 |
| 1,804,795 | Lee | May 12, 1931 |
| 2,014,325 | Grilli | Sept. 10, 1935 |
| 2,292,276 | Knoll | Aug. 4, 1942 |
| 2,452,933 | Joppich et al. | Nov. 2, 1948 |
| 2,537,053 | Hemmeter | Jan. 9, 1951 |
| 2,592,761 | Svendsgaard | Apr. 15, 1952 |
| 2,638,137 | De Back | May 12, 1953 |
| 2,718,843 | Jones | Sept. 27, 1955 |
| 2,730,034 | Svensgaard | Jan. 10, 1956 |

FOREIGN PATENTS

| | | |
|---|---|---|
| 279,363 | Germany | Oct. 19, 1914 |
| 373,629 | Great Britain | May 20, 1932 |
| 374,016 | Great Britain | May 25, 1932 |
| 467,300 | Italy | Dec. 1, 1951 |
| 1,086,762 | France | Aug. 18, 1954 |
| 1,118,772 | France | Mar. 26, 1956 |